US010816087B2

(12) United States Patent
Nique et al.

(10) Patent No.: US 10,816,087 B2
(45) Date of Patent: Oct. 27, 2020

(54) PLANETARY GEARING AND PLANET PIN FOR A PLANETARY GEARING

(71) Applicants: Rolls-Royce Deutschland Ltd & Co KG, Blankenfelde-Mahlow (DE); Rolls-Royce plc, London (GB)

(72) Inventors: Michael Nique, Berlin (DE); Christopher Campbell, Berlin (DE); Mark Spruce, Bristol (GB)

(73) Assignees: ROLLS-ROYCE DEUTSCHLAND LTD & CO KG, Blankenfelde-Mahlow (DE); ROLLS-ROYCE PLC, London (GB)

( * ) Notice: Subject to any disclaimer, the term of this patent is extended or adjusted under 35 U.S.C. 154(b) by 43 days.

(21) Appl. No.: 16/198,253

(22) Filed: Nov. 21, 2018

(65) Prior Publication Data

US 2019/0162293 A1 May 30, 2019

(30) Foreign Application Priority Data

Nov. 24, 2017 (DE) ........................ 10 2017 127 866
Nov. 24, 2017 (DE) ........................ 10 2017 127 874
Nov. 24, 2017 (DE) ........................ 10 2017 127 876

(51) Int. Cl.
*F16H 1/28* (2006.01)
*F16H 57/04* (2010.01)
(Continued)

(52) U.S. Cl.
CPC ............. *F16H 57/08* (2013.01); *F01D 25/18* (2013.01); *F02C 7/36* (2013.01); *F16C 23/045* (2013.01);
(Continued)

(58) Field of Classification Search
CPC .......... F16H 57/08; F16H 1/2836; F16H 1/28; F16H 57/0486; F16H 57/082;
(Continued)

(56) References Cited

U.S. PATENT DOCUMENTS 1,425,430 A 8/1922 Ragnar et al.
2,127,463 A 8/1938 Roland et al.
(Continued)

FOREIGN PATENT DOCUMENTS

CN 201396406 Y 2/2010
CN 202082374 U 12/2011
(Continued)

OTHER PUBLICATIONS

Nique—U.S. Appl. No. 16/198,172, filed Nov. 21, 2018.
(Continued)

*Primary Examiner* — David J Hlavka
(74) *Attorney, Agent, or Firm* — Shuttleworth & Ingersoll, PLC; Timothy J. Klima

(57) ABSTRACT

A planetary gearing includes a sun gear; a plurality of planet gears, a ring gear; and a plurality of planet pins, wherein respectively one planet pin is arranged inside a planet gear, and the planet pin and the planet gear form a lubricated journal bearing. The planet pin includes an axial bore and an inner surface that comprises an axially forward end and an axially rearward end. The inner diameter of the axial bore of the planet pin varies between the axially forward end and the axially rearward end of the inner surface and has a maximum at least at one axial end. The planet pins respectively form a crowning at their abutment surface such that their outer diameter decreases from a maximum outer diameter towards at least an axial end of the abutment surface, and has a minimum at the axial end.

18 Claims, 11 Drawing Sheets

(51) Int. Cl.

| | |
|---|---|
| ***F16H 57/08*** | (2006.01) |
| ***F02C 7/36*** | (2006.01) |
| ***F16C 23/04*** | (2006.01) |
| ***F01D 25/18*** | (2006.01) |

(52) U.S. Cl.

CPC ............. *F16H 1/28* (2013.01); *F16H 1/2836* (2013.01); *F16H 57/0479* (2013.01); *F16H 57/0486* (2013.01); *F16H 57/082* (2013.01); *F05D 2260/40311* (2013.01); *F05D 2260/98* (2013.01); *F16C 2360/23* (2013.01); *F16C 2361/61* (2013.01); *F16H 2057/085* (2013.01)

(58) Field of Classification Search

CPC ........... F16H 57/0479; F16H 2057/085; F16C 23/045; F16C 2360/23; F16C 2361/61; F01D 25/18; F02C 7/36; F05D 2260/40311; F05D 2260/98

See application file for complete search history.

(56) References Cited

U.S. PATENT DOCUMENTS

| | | | | |
|---|---|---|---|---|
| 2,498,295 | A | 2/1950 | Peterson et al. | |
| 2,547,877 | A | 4/1951 | Lucia et al. | |
| 2,749,778 | A | 6/1956 | Otto et al. | |
| 2,932,992 | A | 4/1960 | Larsh et al. | |
| 2,936,655 | A | 5/1960 | Peterson et al. | |
| 3,257,869 | A | 6/1966 | Sharples et al. | |
| 3,355,789 | A | 12/1967 | Clifford et al. | |
| 3,363,413 | A | 1/1968 | Jones et al. | |
| 3,425,301 | A | 2/1969 | Shannon et al. | |
| 4,104,932 | A | 8/1978 | Hansson | |
| 4,271,928 | A | 6/1981 | Northern | |
| 4,384,498 | A | 5/1983 | Eichinger | |
| 5,098,358 | A | 3/1992 | Igaku | |
| 5,518,319 | A | 5/1996 | Selby | |
| 6,964,155 | B2 | 11/2005 | McCune et al. | |
| 8,075,190 | B1 | 12/2011 | Wadehn et al. | |
| 8,205,432 | B2 | 6/2012 | Sheridan | |
| 8,262,535 | B2 | 9/2012 | Klingels | |
| 8,313,412 | B2 | 11/2012 | Montestruck | |
| 8,333,678 | B2 | 12/2012 | McCune | |
| 8,790,213 | B1 | 7/2014 | Isayama et al. | |
| 8,899,916 | B2 | 12/2014 | McCune et al. | |
| 10,047,792 | B2 | 8/2018 | Guettler | |
| 2003/0236148 | A1* | 12/2003 | Fox ...................... | F16C 19/386 475/348 |
| 2004/0192491 | A1 | 9/2004 | Becquerelle et al. | |
| 2004/0259679 | A1 | 12/2004 | Becquerelle et al. | |
| 2005/0075211 | A1* | 4/2005 | Fox ...................... | F16C 33/605 475/348 |
| 2009/0111639 | A1 | 4/2009 | Klingels | |
| 2010/0197445 | A1 | 8/2010 | Montestruc | |
| 2015/0300255 | A1 | 10/2015 | Gallet et al. | |
| 2015/0323056 | A1 | 11/2015 | Sheridan | |
| 2016/0097331 | A1 | 4/2016 | Venter et al. | |
| 2016/0201793 | A1* | 7/2016 | Muldoon ................. | F16H 1/28 475/159 |
| 2016/0341248 | A1 | 11/2016 | Guettler et al. | |
| 2017/0261095 | A1* | 9/2017 | Littlefield ................ | F16H 1/28 |
| 2019/0162292 | A1 | 5/2019 | Nique et al. | |
| 2019/0162293 | A1 | 5/2019 | Nique et al. | |
| 2020/0011411 | A1 | 1/2020 | Gilliland et al. | |

FOREIGN PATENT DOCUMENTS

| | | | |
|---|---|---|---|
| DE | 66534 | A1 | 4/1969 |
| DE | 2235448 | A1 | 2/1974 |
| DE | 2648154 | A1 | 5/1977 |
| DE | 2925964 | A1 | 1/1980 |
| DE | 2843459 | A1 | 4/1980 |
| DE | 289318 | A5 | 4/1991 |
| DE | 10318945 | B3 | 10/2004 |
| DE | 602004001476 | T2 | 2/2007 |
| DE | 102005054088 | A1 | 5/2007 |
| DE | 102007031726 | A1 | 1/2009 |
| DE | 102013221265 | A1 | 5/2015 |
| DE | 102015221633 | A1 | 5/2017 |
| DE | 102016124738 | A1 | 6/2018 |
| EP | 0188616 | A1 | 7/1986 |
| EP | 1028275 | A2 | 8/2000 |
| EP | 1649191 | A1 | 4/2006 |
| EP | 2518296 | A2 | 10/2012 |
| SU | 533779 | A1 | 10/1976 |
| WO | 2013106879 | A1 | 7/2013 |

OTHER PUBLICATIONS

Nique—U.S. Appl. No. 16/198,327, filed Nov. 21, 2018.

European Search Report dated Mar. 15, 2019 for related European Patent Application No. 18206982.3.

European Search Report dated Mar. 14, 2019 for related European Patent Application No. 18207036.7.

German Search Report dated Sep. 11, 2018 from counterpart German App No. 10 2017 127 866.4.

German Search Report dated Sep. 13, 2018 from counterpart German App No. 10 2017 127 874.5.

German Search Report dated Sep. 19, 2018 from counterpart German App No. 10 2017 127 876.1.

European Search Report dated Apr. 10, 2019 for counterpart Euroepan Patent Application No. 18206995.5.

* cited by examiner

PLANETARY GEARING AND PLANET PIN FOR A PLANETARY GEARING

This application claims priority to German Patent Application Nos. DE102017127866.4 filed Nov. 24, 2017, DE102017127874.5 filed Nov. 24, 2017 and DE102017127876.1 filed Nov. 24, 2017, the entirety of all three applications are incorporated by reference herein.

The invention relates to a planetary gearing according to the present disclosure and a pin for such a planetary gearing.

Planetary gearings are generally known. Among other things, they are used in gear fan engines to provide a gear reduction between a turbine shaft coupled with a turbine and a fan shaft coupled with a fan.

US 2015/0300255 A1 describes a planetary gearing of a gear fan engine in which cylindrical planet pins are respectively arranged in planet gears that are driven by a sun gear and rotate in a stationary ring gear, forming a lubricated journal bearing to the planet gear. The planet pins are connected to a torque carrier that is coupled to a fan shaft.

In gear fan engines, planetary gearings are exposed to very high centrifugal forces and torques that deform the planet pin and the planet gear and can influence the lubricating film in the slide bearing between these two elements, whereby the functionality of the slide bearing is compromised. In particular, the cylindrical planet pin that is affixed at its ends in support plates is subject to bending as a result of the occurring forces, due to which the thickness of the lubricating film increases in the center of the planet pin and is reduced at the ends of the planet pin, which leads to an increased lubricating film pressure at the ends of the planet pin and to the danger of a metal-on-metal contact occurring between the planet pin and the planet gear. As a result, the planet pin is subject to strong loads and wear on its ends.

These loads and wear can be reduced through an improved stiffness of the planet pin. However, the increase in the wall thickness of the planet pin that is necessary for this purpose results in increased weight, which is disadvantageous when used in aeronautical applications.

The present invention is based on the objective of providing a planetary gearing with an improved planet pin as well as a pin for such a planetary gearing.

This objective is achieved through a planetary gearing with the features as disclosed herein and a pin with features as disclosed herein. Embodiments are also disclosed herein.

Accordingly, the invention regards a planetary gearing that comprises a sun gear, a plurality of planet gears, a ring gear, and a plurality of planet pins. The sun gear rotates about a rotation axis of the planetary gearing and is driven by a sun shaft. Here, the rotation axis of the planetary gearing defines an axial direction of the planetary gearing. The planet gears are driven by a sun gear and are in engagement with the ring gear. Respectively one planet pin is arranged in a planet gear, wherein the planet pin and the planet gear form a lubricated journal bearing in which the adjoining contact surfaces of the slide bearing are separated from each other by a slide bearing gap. The planet pin has an outer-side abutment surface that comprises an axially forward end and an axially rearward end. Further, the planet pin is provided with an axial bore and has an inner surface that comprises an axially forward end and an axially rearward end.

In the present invention, it is provided that the inner diameter of the axial bore of the planet pin varies between the axially forward end and the axially rearward end of the inner surface, and at that has a maximum at least at one axial end, and that the planet pins respectively form a crowning at their outer-side abutment surface, namely in the sense that, from a maximum outer diameter, their outer diameter decreases towards at least one axial end of the abutment surface and has a minimum at the axial end. Here, the abutment surface of the planet pin formed with a crowning forms a contact surface of the slide bearing that the planet pin forms with the planet gear.

For one thing, the solution according to the invention is based on the idea of not forming the planet pin in the area of the axial bore in a cylindrical manner, but rather to provide it with an inner diameter that varies in the axial direction, wherein the inner diameter has a maximum at least at an axial end of the inner surface. Accordingly, along its axial extension, the planet pin shows a change of its wall thickness that results from the changing diameter of the axial bore. Here, the wall thickness of the planet pin is minimal at least at an axial end of the inner surface (corresponding to a maximum inner diameter of the axial bore). In embodiments of the invention, the wall thickness of the planet pin is minimal at both axial ends of the inner surface. Between the axial ends, the planet pin has a maximal wall thickness (corresponding to a minimum inner diameter of the axial bore).

What is provided is a structure in which the planet pin has a greater wall thickness in the center than at its axial ends (or than at least at one of its axial ends), whereby the stiffness of the planet pin is increased, and correspondingly loads and wear are reduced.

In addition, thanks to the reduced wall thickness towards the axial ends, the planet pin can be more easily deformed at its axial ends during operation, so that the planet pin can nestle against the planet gear more easily when under load, and an even slide bearing gap can be created across the axial length of the slide bearing.

For another thing, the solution according to the invention is based on the idea of not forming the planet pin in a cylindrical manner at the outer side, but rather to provide it with a crowning which results in the outer diameter of the planet pin being minimal at least at one axial end of the abutment surface. In this manner, an enlarged slide bearing gap and consequently also an enlarged lubricating film thickness is provided at least at one end of the abutment surface. As a result, when deformations and vibrations as caused by the centrifugal forces and the introduced torques occur during operation at the ends of the abutment surface, the lubricating film thickness remains sufficiently great at least at one axial end of the abutment surface to avoid excessive lubrication film pressure and the danger of a metal-on-metal contact between the planet pin and the planet gear.

The slide bearing is optimized in that contact surfaces that are aligned in parallel are also provided at the axial ends of the slide bearing during operation. The lubricating film thickness has smaller thickness variations across it axial length. Here, the mentioned advantages are achieved without increasing the wall thickness of the planet pin. Instead, even a certain weight reduction can be achieved, since the crowning of the abutment surface may be obtained by removing material towards the axial ends of the abutment surface.

By combining an inner diameter that varies in the axial direction with a crowning of the planet pin, it is achieved that, on the one hand, the planet pin can be embodied with a low weight, wherein the load on the bearing is reduced, and, on the other hand, it can be readily deformed during operation at its axial ends, so that the planet pin can better nestle against the planet gear under load, and an even slide bearing gap with contact surfaces that are aligned in parallel can be created along the axial length of the slide bearing.

In one embodiment of the invention, it is provided that internally the planet pin is formed in such a manner that it has maximal inner diameters at both axial ends of the inner surfaces and a minimum inner diameter between the axial ends, wherein the maximum inner diameters can be identical or differing at the two axial ends. Thus, according to this embodiment variant, the inner diameter is maximal at both axial ends. In an alternative embodiment, the inner diameter is minimal at the one axial end of the inner surface, wherein the inner diameter continuously increases towards the other axial end up to a maximum.

Further, it can be provided that the inner diameter of the axial bore of the planet pin continuously increases towards at least one axial end of the inner surface, wherein the maximum inner diameter is only reached at the axial position of the respective axial end of the inner surface.

In a further embodiment of the invention, it is provided that the inner surface of the planet pin forms a first curve in the longitudinal section which extends between the minimum and the forward axial end, and forms a second curve that extends between the minimum and the rearward axial end. Here, the first and the second curve can in general be formed in any desired manner. In exemplary embodiments, it is provided that the first curve and/or the second curve is formed as a circular arc, that the first curve and/or the second curve is formed in a parabolic manner, or that the first curve and/or the second curve is formed in a rectilinear manner, or has rectilinearly formed curve portions. It can also be provided that the first curve and/or the second curve is comprised of multiple differently bent curve portions. Here, it can further be provided that one or multiple of these curve portions are formed in a rectilinear/linear manner.

If the first curve and the second curve are formed in a rectilinear manner, the axial bore is formed according to one embodiment variant as a double conical bore, which respectively tapers off conically from the axial ends towards the axial center of the bore. If the first curve and the second curve have rectilinearly shaped curve portions, the axial bore according to one embodiment variant comprises a double conical bore, respectively tapering in a conical manner from the axial ends towards an axial center of the bore, and then transitioning via a rounded curve for example into a cylindrical area of a constant inner diameter.

In one embodiment of the invention, the minimum of the inner diameter of the planet pin is formed by a circumferential line (which extends in the circumferential direction of the planet pin at the inner surface). Thus, in the longitudinal section of the planet pin, the minimum is a point. This means that the mentioned first curve and the mentioned second curve transition into each other directly, so that the inner surface can be formed by a single bent curve (which in the embodiment variants can be comprised of differently bent curve portions). Accordingly, it can be provided in embodiments of the invention that the inner surface of the planet pin is formed to be completely circular or parabolic with a minimum of the inner diameter in the axial center of the planet pin or alternatively outside of the axial center of the planet pin.

In one alternative embodiment of the invention, it is provided that the minimum of the inner diameter of the planet pin is formed by a cylindrical area with a constant inner diameter extending across a defined axial length. According to one embodiment variant, this axial length is dimensioned in such a manner that the ratio of the axial length of the cylindrical area to the axial total length of the abutment surface is between 0 and 0.75.

Such a cylindrical plateau area can be formed in the center or off-center. Circular, parabolic or rectilinear surfaces may connect to it in the longitudinal section, for example.

In a further embodiment of the invention it is provided that the ratio between the minimum inner diameter and the maximum inner diameter(s) is between 0 and 0.99. If the ratio is 0, the minimum inner diameter equals 0, i.e. the axial bore of the planet pin is not formed to be continuous, but rather to be closed at least at one axial point.

According to one embodiment of the invention, the planet pin is formed as a rotational body, i.e. it is rotationally symmetrical with respect to the longitudinal axis of the pin.

According to one embodiment of the invention, the planet pin has an axial forward end and an axial rearward end, which are arranged at an axial distance to the axially forward end and the axially rearward end of the abutment surface, wherein, at its forward axial end, the planet pin is connected to a forward support plate and, at its rearward axial end, is connected to a rearward support plate. Thus, the planet pin extends at both ends to beyond the inner surface and there is respectively connected to a support plate. Thus, it has to be differentiated between the axial ends of the inner surface and the axial ends of the planet pin.

According to one embodiment of the invention, the planet pins are coupled with a torque carrier, wherein, when the sun gear rotates and the ring gear is fixedly arranged, the torque carrier rotates with a reduced speed about the rotation axis of the planetary gearing. Here, the torque carrier may for example be coupled to a fan shaft. The planet gears thus rotate about their own axis as well as about the rotation axis of the planetary gearing, respectively doing so with different rotational speeds.

Here, it is provided in one embodiment of the invention that the planet pins are configured for receiving a support pin of the torque carrier in the axial bore, with a torque transmission occurring via the support pin.

Alternatively, it can be provided that the planet pins are fixedly connected to a forward support plate and with a rearward support plate, wherein the forward support plate is coupled to the torque carrier for torque transmission. Here, the planet pins can for example be screwed or welded together with the support plates.

The planet pin of the present invention has an axial bore with a varying inner diameter. Here, the planet pin can generally be formed in any desired manner at the outer-side abutment surface. For example, the planet pin can be formed in a cylindrical manner at the outer-side abutment surface. In other variants, it can be provided that the outer-side abutment surface forms a crowing in the sense that its outer diameter decreases from a maximum outer diameter towards at least one axial end of the abutment surface and has a minimum at its axial end.

With regard to the aspect of the invention according to which the planet pin forms a crowning at its outer side, the following embodiment variants can be provided.

In one embodiment, it is provided that, at their abutment surface, the planet pins form a crowning in the sense that their outer diameter decreases towards both axial ends of the abutment surface and that it has a minimum at both axial ends. In particular, it can be provided that the planet pin has minimal outer diameters at the two axial ends of the abutment surface and has the maximum outer diameter between the axial ends, wherein the minimum outer diameters at the two ends can be identical or different. Here, the difference between the maximum outer diameter and the minimum outer diameter at the one end of the abutment surface defines the crowning between the maximum outer diameter and the one end. Further, the difference between the maximum outer diameter and the minimum outer diameter at the other end abutment surface defines the crowning between the maximum outer diameter and the other end.

Thus, according to this embodiment variant, the outer diameter is minimal at both axial ends minimal, i.e. decreases towards both axial ends. Thus, it is specifically not provided that the outer diameter extends adjacent to the axial ends, in which case the axial ends would be shaped cylindrically. According to an alternative embodiment, the outer diameter has a maximum outer diameter at an axial end of the abutment surface, wherein the outer diameter continuously decreases towards the other axial end up to a minimum.

Correspondingly, it can be provided that the difference between the maximum outer diameter and the outer diameter at a regarded axial position of the planet pin continuously increases towards both axial ends or to an axial end of the planet pin. For the slide bearing gap, this means that it also increases towards the axial ends of the planet pin, as regarded in the assembled state without any loading and in the non-rotating state. Here, it is assumed that the contact surface of the planet gear forming the other surface of the slide bearing is cylindrically formed. During operation or under load, the planet gear nestles against the planet pin, so that an even gab is created across the axial length.

In a further embodiment, it is provided that the abutment surface of the planet pin forms a first convex curve in the longitudinal section, extending between the maximum of the outer diameter and the forward axial end of the abutment surface, and forms a second convex curve extending between the maximum of the outer diameter and the rearward axial end of the abutment surface. Here, the convex curve can in general be formed in any desired manner. In exemplary embodiments, it is provided that the first curve and/or the second curve is formed as a circular arc, that the first curve and/or the second curve is formed in a parabolic manner, or that the first curve and/or the second curve has rectilinearly shaped curve portions. In the latter case, the abutment surface of the planet pin may for example conically converge towards its axial ends. It can also be provided that the first curve and/or the second curve are comprised of multiple curve portions that are differently bent. Here, it can further be provided that one or multiple of these curve portions are formed in a rectilinear/linear manner.

In one embodiment of the invention, the maximum of the outer diameter of the planet pin is formed by a circumferential line (which extends in the circumferential direction of the planet pin). Thus, the maximum forms a point in the longitudinal section of the planet pin. This means that the mentioned first curve and the mentioned second curve steadily transition into each other, so that the abutment surface can be formed by a single bent curve (which can be comprised of differently bent curve portions in the embodiment variants). Accordingly, it can be provided in embodiments of the invention that the abutment surface of the planet pin is formed to be completely circular or parabolic with a maximum of the outer diameter in the axial center of the planet pin or alternatively outside the axial center of the planet pin.

In one alternative embodiment of the invention, it is provided that the minimum of the outer diameter of the planet pin is formed by a cylindrical area with a constant outer diameter extending across a defined axial length. According to one embodiment variant, this axial length is dimensioned in such a manner that the ratio of the axial length of the cylindrical area to the axial total length of the abutment surface is between 0 and 0.75.

Such a cylindrical plateau area can be formed in the center or off-center. Circular, parabolic or rectilinear surfaces may connect to it in the longitudinal section, for example.

In one embodiment of the invention it is provided that the ratio of half the difference between the maximum outer diameter and the minimum outer diameter of the planet pin to the maximum outer diameter is between 0.00005 and 0.005. Here, the indicated half the difference specifically refers to the crowning of the planet pin. If the planet pin has different minimal outer diameters at the two axial ends of the abutment surface, the mentioned ratio respectively applies with respect to the maximum outer diameter and the minimum outer diameter at the respectively regarded axial end.

In further variants of the invention it is provided that the planet pin has a maximum of its outer diameter in its axial center (i.e. centrally between the axially forward end and the axially rearward end of the abutment surface). The planet pin is formed to be mirror-symmetrical with respect to its axial center. However, this is not necessarily the case. In alternative variants of the invention it is provided that the planet pin has a maximum of its outer diameter outside its axial center, and is correspondingly formed asymmetrically with respect to its axial center.

According to one embodiment of the invention, the planet pin is formed as a rotational body, i.e. it is rotationally symmetrical with respect to the longitudinal axis of the pin. However, this is not necessarily the case. According to alternative embodiments, the planet pin has an abutment surface with a crowned design only across a circumferential angle that is smaller than 360°, in particular in the range of ±60° about the nominally loaded area. Thus, the crowned profile of the planet pin according to the invention does not extend over the entire circumference of the planet pin, but only over a defined angular range in the circumferential direction. The described positive effect on the slide bearing is achieved also in such an embodiment. In addition, the oil consumption for lubrication is reduced, since an increased lubricating film thickness at the axial ends is not provided over the entire circumference.

If the planet pin is formed in a rotationally symmetrical manner, the outer diameter at a regarded axial position is the same for all points of a circumferential line. If the planet pin is not formed in a rotationally symmetrical manner, the largest outer diameter is considered the outer diameter of a regarded axial position within the meaning of the present invention.

According to one embodiment of the invention, the planet pin has an axially forward end and an axially rearward end, which are arranged at an axial distance to the axially forward end and the axially rearward end of the abutment surface, wherein, at its forward axial end, the planet pin is connected to a forward support plate and, at its rearward axial end, is connected to a rearward support plate. Thus, the planet pin extends at both ends to beyond the abutment surface, and there is respectively connected to a support plate. Thus, it has to be differentiated between the axial ends of the abutment surface and the axial ends of the planet pin.

In another invention aspect, the invention relates to a pin for a planetary gearing that is provided with an axial bore and has an inner surface comprising an axially forward end and an axially rearward end. It is provided that the inner diameter of the axial bore of the pin varies between the axially forward end and the axially rearward end of the inner surface, and at that has a maximum at least at one axial end.

Further, it is provided that the pin forms a crowning at its abutment surface in the sense that its outer diameter decreases from a maximum outer diameter towards at least one axial end of the abutment surface and has a minimum at the axial end. The advantageous embodiments according to patent claims 2 to 18 that have been explained with respect to the planetary gearing also apply to the pin. Generally, the pin can be used in any kind of gear with a slide bearing.

In a further aspect of the invention, the invention relates to a gear fan engine that comprises a fan stage, a fan shaft via which the fan stage is driven, and a turbine shaft. The turbine shaft may for example be a shaft that is coupled to a low-pressure turbine or a medium-pressure turbine of the engine. It is provided that the turbine shaft and the fan shaft are coupled via a planetary gearing according to claim 1, wherein the turbine shaft forms the sun shaft, the planet pins are coupled to a torque carrier, and the torque carrier is coupled to the fan shaft.

It is to be understood that the present invention is described with respect to a cylindrical coordinate system, having the coordinates x, r and cp. Here, x indicates the axial direction, r indicates the radial direction, and φ indicates the angle in the circumferential direction. Here, the axial direction is defined by the rotation axis of the planetary gearing, which is identical with the machine axis of a gear fan engine inside of which the planetary gearing is arranged. Beginning at the x-axis, the radial direction points radially outward. Terms such as “in front”, “behind”, “frontal” and “rear” always refer to the axial direction or the flow direction inside the engine inside of which the planetary gearing is arranged. Terms such as “outer” or “inner” refer to the radial direction.

In the following, the invention is explained in more detail based on multiple exemplary embodiments by referring to the Figures of the drawing. Herein:

Figure 1:
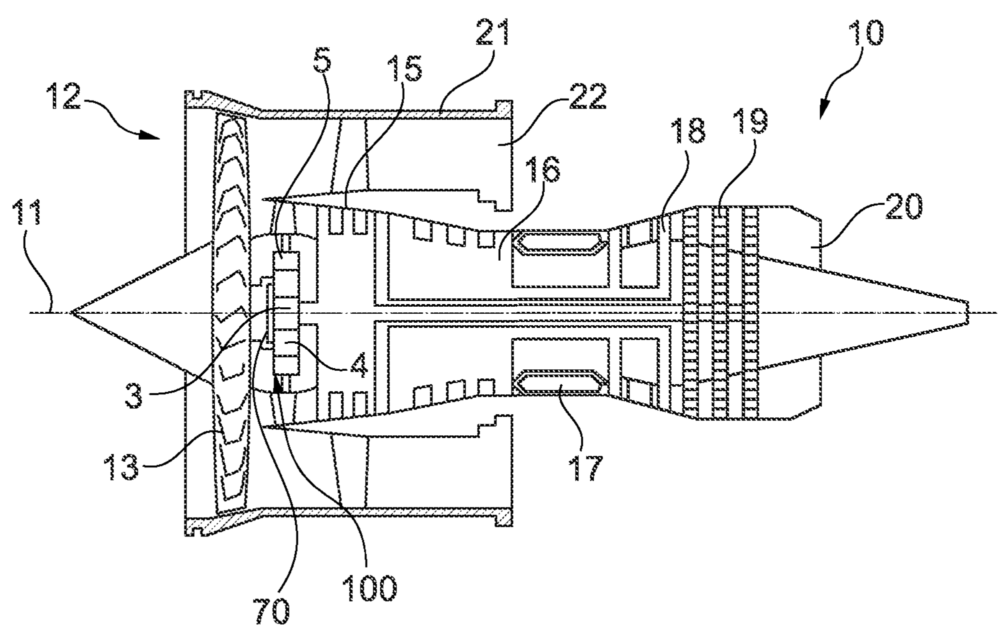
FIG. 1 shows a simplified schematic sectional rendering of a gear fan engine.

FIG. 1 shows a gear fan engine 10 with a rotation axis 11 that is provided for being used in airplanes. In the direction of the axial through flow, the gear fan engine 10 successively comprises an air intake 12, a fan stage 13 (in general also more than one fan stage 13 is possible), a gear 100, a medium-pressure compressor 15, a high-pressure compressor 16, a combustion device 17, a high-pressure turbine 18, a medium-pressure turbine 19, and a nozzle 20. A fan housing 21 surrounds the fan stage 13 and defines the air intake 12.

In general, the gear fan engine 10 operates in a conventional manner, wherein air entering the intake 12 is accelerated by the fan stage 13. Here, two air flows are created. A first flow flows into the medium-pressure compressor 15, a second air flow flows through a bypass channel 22, wherein the second air flow provides the greatest portion of the thrust of the gear fan engine 10. The medium-pressure compressor 15 compresses the entering air flow before it reaches the high-pressure compressor 16 inside of which further compression occurs. The compressed air that is discharged from the high-pressure compressor 16 is introduced into the combustion device 17 where it is intermixed with fuel, and the mixture is then combusted. The hot combustion gases are decompressed in the high-pressure turbine 18 and in the medium-pressure turbine 19 before being discharged through the nozzle 20, and thus providing additional thrust.

Thus, the gear fan engine 10 forms a bypass channel 22 and a primary flow channel behind the fan stage 13. The primary flow channel leads through the core engine (gas turbine) that comprises the medium-pressure compressor 15, the high-pressure compressor 16, the combustion device 17, the high-pressure turbine 18, and the medium-pressure turbine 19. The bypass channel 22 guides air which is sucked in by the fan stage 13 during operation of the gear fan engine 10 past the core engine.

Via shaft devices, the high-pressure turbine 18 and the medium-pressure turbine 19 respectively drive the high-pressure compressor 16 and the medium-pressure compressor 15. A medium-pressure shaft drives the fan stage 13 via the gear 100. Here, the gear 100 is embodied as a reduction gear which reduces the rotational speed of the fan stage 13 as compared to the medium-pressure compressor 15 and to the medium-pressure turbine 19. In the shown embodiment, the gear 100 is a planetary gearing with a static ring gear 5 and circumferential planet gears 4 rotating in the ring gear 5. The gears 100 are driven via a sun gear 3 that is coupled to the medium-pressure shaft. In the shown embodiment, the drive is provided via a torque carrier 70 that is coupled to the planet gears 4.

In general, also other embodiments of the gear 100 are possible, wherein e.g. the ring gear 5 can be formed in a movable manner, so that the drive is provided via the ring gear 5.

The embodiment of the gear fan engine 10 according to FIG. 1 is to be understood merely as an example. In particular, the arrangement of the shafts can also be chosen to be different, wherein in general arrangements with two or three shafts are possible. For example, a three-shaft arrangement can alternatively be provided that comprises a low-pressure shaft connecting the low-pressure turbine to the fan, a medium-pressure shaft connecting the medium-pressure turbine to the medium-pressure compressor, and a high-pressure shaft connecting the high-pressure turbine to the high-pressure compressor. Here, the fan stage 13 is connected via a gear to the low-pressure shaft. Further, if the turbofan engine does not have a medium-pressure compressor and a medium-pressure turbine, only a low-pressure shaft and a high-pressure shaft can be present, with the fan stage 13 again being connected via a gear to the low-pressure shaft.

With the rotation axis 11, the described components have a common rotational or machine axis. The rotation axis 11 defines an axial direction of the engine 10. A radial direction of the engine 10 extends perpendicular to the axial direction.

What is relevant in the context of the present invention is the embodiment of the planetary gearing 100.

Figure 2:
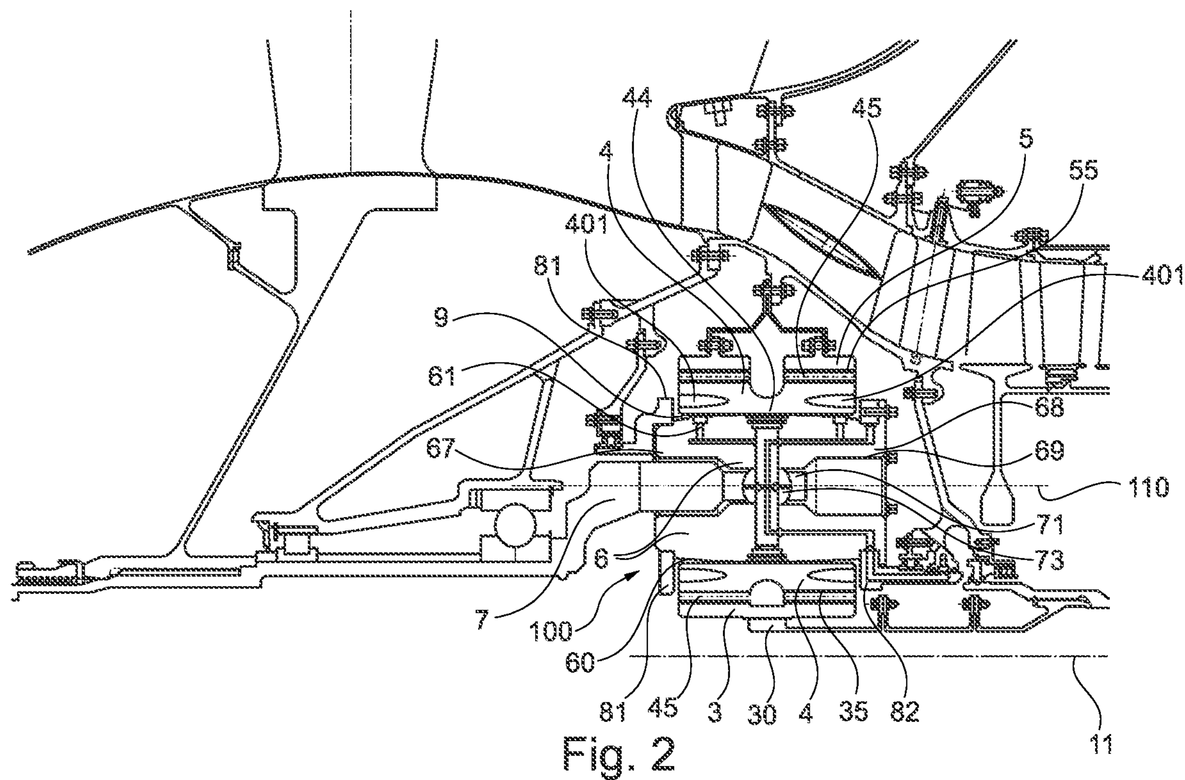
FIG. 2 shows a sectional rendering of elements of a planetary gearing that is suitable for being used in a gear fan engine, wherein a sun shaft, a sun gear, a planet gear, a planet pin and a support pin of a torque carrier are shown, and wherein the planet pin forms a crowing at its abutment surface.

FIG. 2 shows an exemplary embodiment of a planetary gearing 100 in a sectional rendering. The planetary gearing 100 comprises a sun gear 3 that is driven by a sun shaft 30. The sun shaft 30 may for example be the medium-pressure shaft of FIG. 1. Here, the sun gear 3 and the sun shaft 30 rotate about a rotation axis 11 that defines an axial direction of the planetary gearing 100.

The planetary gearing 100 further comprises a plurality of planet gears 4 of which one is shown in the sectional rendering of FIG. 2. The sun gear 3 drives the plurality of planet gears 4, wherein a toothing 35 of the sun gear 3 is in engagement with the toothing 45 of the planet gear 4. The toothing 35, 45 may for example be a double helical gearing.

The following description of a planet gear 4 applies to all planet gears that are driven by a sun gear 3. The planet gear 4 is configured as a hollow cylinder and forms an outer shell surface and an inner shell surface 44, Driven by the sun gear 3, the planet gear 4 rotates about a rotation axis 110 that extends in parallel to the rotation axis 11. The outer shell surface of the planet gear 4 forms a toothing 45 that is in engagement with the toothing 55 of a ring gear 5. The toothings 45, 55 can also be formed as double helical gearing. The ring gear 5 is arranged in a stationary, i.e. non-rotating, manner. The planet gears 4 rotate as a result of being coupling with the sun gear 3, and in doing so travel along the circumference of the ring gear 5. The rotation of the planet gears 4 along the circumference of the ring gear 5 and at the same time about the rotation axis 110 is slower than the rotation of the sun shaft 3, whereby a gear reduction is provided.

Adjacent to its inner shell surface 44, the planet gear 4 has a centered axial opening. Inserted into the opening is a planet pin 6, wherein the planet pin 6 and the planet gear 4 form a lubricated journal bearing at their facing surfaces. For lubricating the slide bearings, radially extending lubricating film openings 61 can be formed in the planet pin 6, through which lubricating oil that is sprayed in from the inside or supplied in another manner can be supplied into a slide bearing gap 9 between the planet pin 6 and the planet gear 4. Here, it is to be understood that also additional or other kinds of means for supplying lubricating oil to the slide bearing can be provided in the planet pin 6.

During operation, the planet gear 4 and the planet pin 6 do not have the exact same axis, since the slide bearing with its hydrodynamic design entails an eccentricity in the range of tenths of a millimeter.

The planet pin 6 has an outer-side abutment surface 60 that is formed in a crowned manner. Accordingly, the outer diameter of the planet pin decreases towards the axial ends of the abutment surface 60 and has a minimum there.

Adjacent to its inner surface 69, the planet pin 6 also has an axial opening or bore and is provided for the purpose of receiving a support pin 7 of a torque carrier therein. At that, the support pin 7 is mounted in a tapering area 71 of the support pin 7 in a joint bearing 73 inside the bore of the planet pin 6. The joint bearing 73 allows for a certain degree of tilting of the support pin 7 with respect to the rotation axis 110. A support pin 7 is arranged in each of the planet pins 6 of the planetary gearing 100. At their ends that project from the opening of the planet pin 6, the support pins 7 are fixedly connected to each other and at that form a torque carrier corresponding to the torque carrier 70 of FIG. 1. The torque carrier forms a drive element of the planetary gearing and is coupled to the fan shaft or in general to the output shaft.

Here, the exact shape of the support pin 7 and its shown mounting at the inner surface of the planet pin 6 are to be understood merely as an example. It is also to be understood that a coupling of the planet pin 6 to the torque carrier can also be realized in a different manner, as shown based on FIGS. 4 and 5 by way of example.

FIG. 2 further shows a forward support plate 81 and a rearward support plate 82. The planet pin 6 is affixed at the forward support plate 81 and at the rearward support plate 82, for example it may be screwed or welded together with them. For this purpose, it is provided that the planet pin 6 has an axially forward end 67 and an axially rearward end 68 which respectively axially protrude with respect to the ends of the abutment surface 60, wherein the planet pin 6 is attached at the support plates 81, 82 at the ends 67, 68.

The structure of the planet gear 4 and of the planet pin 6 will be explained in more detail in the following with respect to FIG. 3, which represents a section of FIG. 2.

Figure 3:
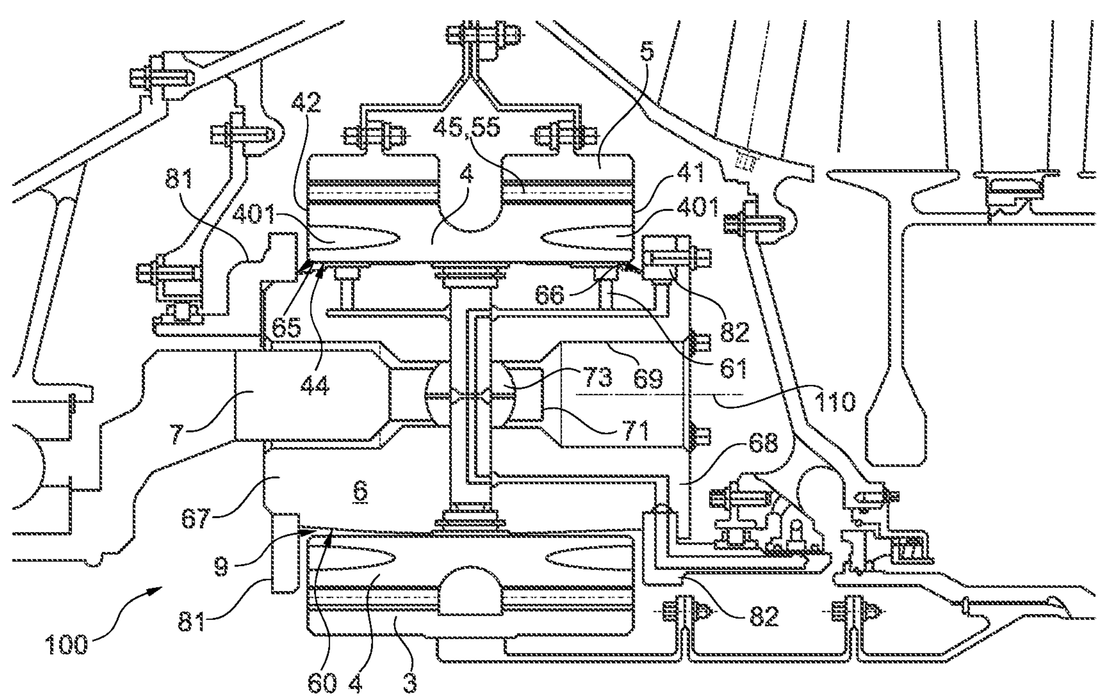
FIG. 3 shows an enlarged rendering of the planet gear and of the planet pin of FIG. 2.

As can be seen in FIG. 3, at its two face sides 41, 42, the planet gear 4 forms respectively one recess 401 that extends from the face side 41, 42 substantially in the axial direction (or starting from the face side 41 counter to the axial direction) into the interior space of the planet gear 4. In this way, the mass of the planet gear 4 and the stiffness of the planet gear 4 are reduced towards its face sides 41, 42.

The slide bearing between the planet pin 6 and the planet gear 4 is formed by the cylindrical inner shell surface 44 of the planet gear 4 and the abutment surface 60 of the planet pin 6 that is provided with a crowning. Here, due to the curvature of the abutment surface 60, the slide bearing gap 9 formed in the area of the slide bearing increases in radial thickness towards the axially forward end and towards the axially rearward end of the slide bearing. However, in the event that strong torques and centrifugal forces occur, the adjacent surfaces 44, 60 of the slide bearing can align to be substantially in parallel at its ends. This is also supported by the recesses 401 that are formed in the planet gear 4, which provide the latter with an increased flexibility at its ends.

The abutment surface 60 has an axially forward end 65 and an axially rearward end 66.

Figure 4:
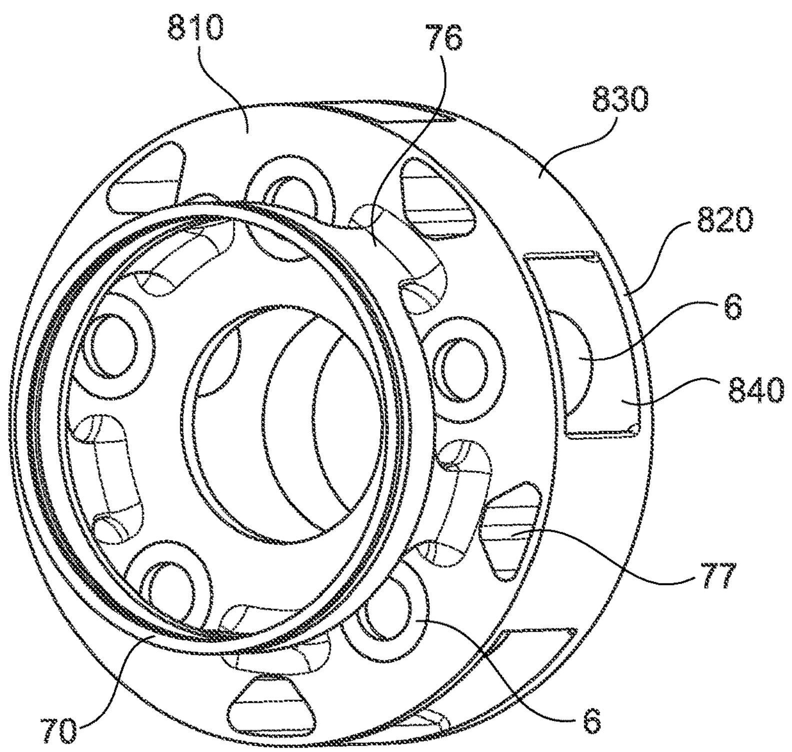
FIG. 4 shows a rendering of elements of an alternative planetary gearing in which, in contrast to the planetary gearing of FIGS. 2 and 3, no support pin is provided, and a torque transmission to a torque carrier instead occurs via a support plate that is fixedly connected to the planet pins.
Figure 5:
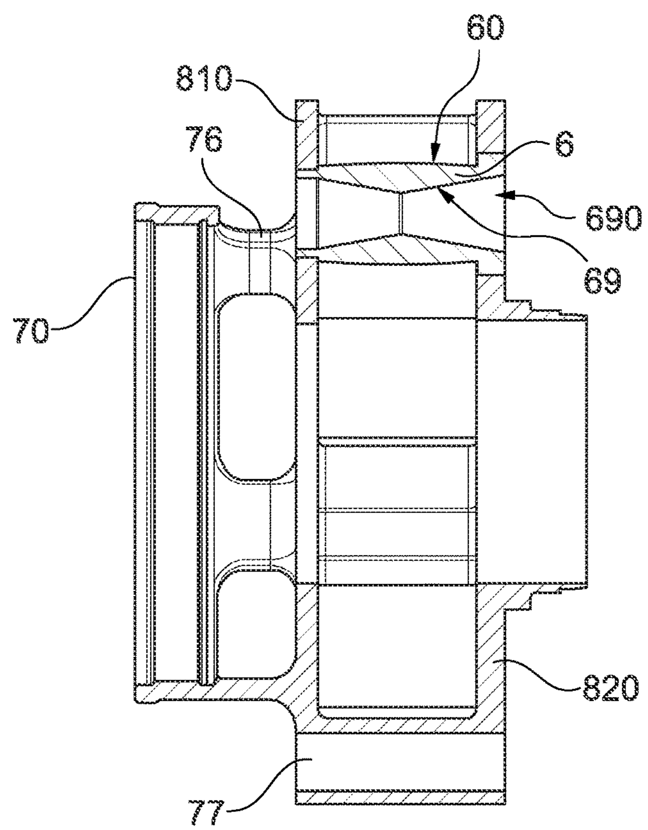
FIG. 5 shows elements of the planetary gearing of FIG. 4 in a partially sectioned view.

FIGS. 4 and 5 show elements of a further planetary gearing. In general, the planetary gearing of FIGS. 4 and 5 has the same structure as the planetary gearing of FIGS. 2 and 3. It only differs in the manner in which the torque is received and transmitted to a torque carrier (corresponding to the torque carrier 70 of FIG. 1). FIG. 4 only shows such elements of the planetary gearing that relate to this different manner of torque transmission. The other elements that are not shown correspond to the embodiment of FIGS. 2 and 3. In particular, the gear comprises a sun gear, a sun shaft, a plurality of planet gears driven by the sun gear, and a ring gear, as has been explained with respect to FIGS. 2 and 3 *t*.

As can be seen in FIGS. 4 and 5, the planet pins 6 are fixedly connected to a forward support plate 810 and a rearward support plate 820. For example, they may be fixedly screwed or welded together with the support plates 810, 820. Just like in the exemplary embodiment of FIGS. 2 and 3, the planet pin 6 respectively has one crowned outer-side abutment surface 60. At its inner surface 69, the planet pin 6 forms a bore 690, with its inner diameter decreasing towards the axial center of the planet pin. In the shown exemplary embodiment, the bore 690 is formed as a double cone. This will be explained in more detail with respect to FIGS. 17 and 18.

In contrast to the exemplary embodiment of FIGS. 2 and 3, the axial bore 690 of the planet pin 6 does not receive a support pin of a torque carrier, but is empty. There is no support pin. The transmission of a torque onto a torque carrier 70 is realized via connecting webs 76 that fixedly connect the torque carrier 70 to the forward support plate 810. In the shown exemplary embodiment, the torque carrier 70 is formed as a ring. However, this is to be understood merely as an example. The torque carrier 70 is coupled to the fan shaft in a manner that is not shown.

In the exemplary embodiment of FIGS. 4 and 5, the torque carrier 70, the forward support plate 810 and the rearward support plate 820 are formed in one piece, while in the exemplary embodiment of FIGS. 2 and 3 they are formed in three pieces. By combining the torque carrier and the support plates into one part, the support pin 7 of FIGS. 2 and 3 can be omitted. The reception of the torque does no longer occur centrally in the bore of the planet pin 6, but by the forward support plate 810. Accordingly, in the exemplary embodiment of FIGS. 4 and 5, there is also no joint bearing (corresponding to the joint bearing 73 of FIGS. 2 and 3) needed.

As for the one-piece structure of the forward support plate 810, the rearward support plate 820 and the torque carrier 70, it is further remarked that the forward support plate 810 and the rearward support plate 820 are connected to each other by wall surfaces 830 formed at the circumference, with respectively substantially rectangular recesses 840 being located in between them which serve for receiving respectively one planet gear. Further, the structural unit formed by the two support plates 810, 820 and the torque carrier 70 has axial bores 77 that may serve for coupling further parts (not shown) for torque transmission.

The shown number of five planet pins 6, five connecting webs 76 and five axial bores 77 is to be understood merely as an example.

Figure 6:
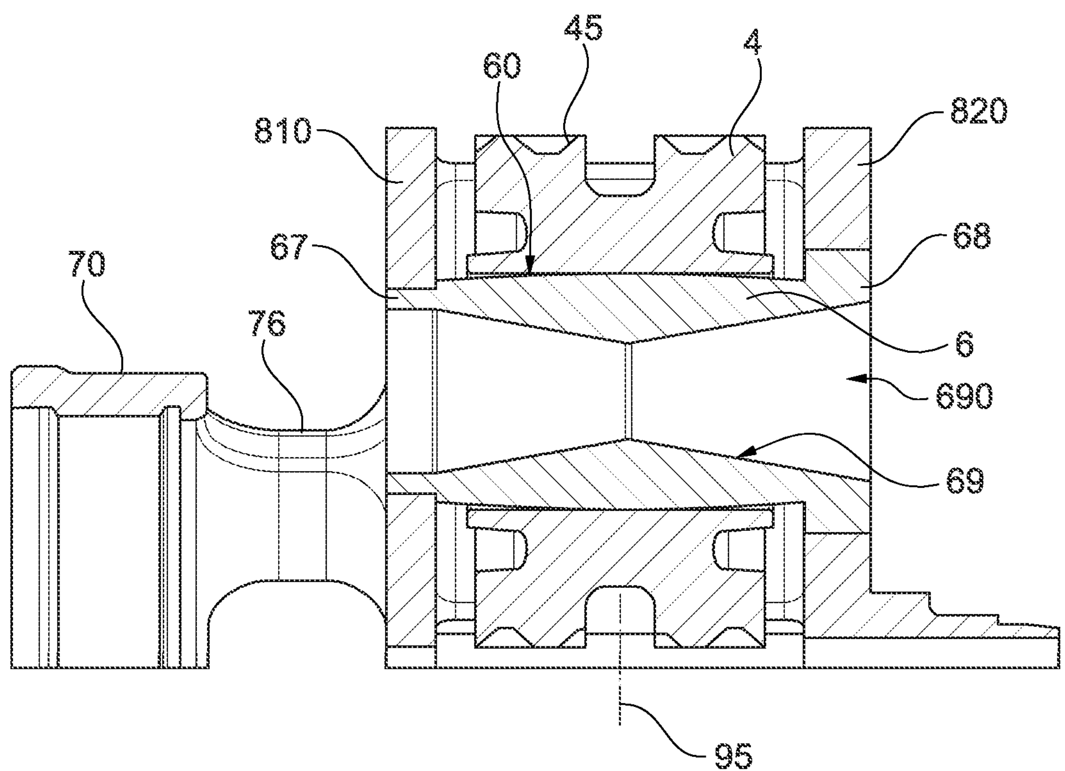
FIG. 6 shows a partially sectioned rendering of a planet pin that is arranged in a planetary gearing according to FIGS. 4 and 5.

FIG. 6 shows an exemplary embodiment of a planet pin 6 that forms a slide bearing with a planet gear 4 with an outer toothing 45. The planet pin 6 is fixedly connected to a structure which, correspondingly to the exemplary embodiment of FIGS. 4 and 5, consist of a forward support plate 810, a rearward support plate 820, and a torque carrier 70. For this purpose, the planet pin 6 comprises a first axial elongation 67 that is attached inside the forward support plate 810 and a second axial elongation 68 that is attached inside the rearward support plate 820.

The torque carrier 70 is fixedly connected to the forward support plate 810 by means of connecting webs 76. With regards to this, the description of FIGS. 4 and 5 is referred to.

The planet pin 6 has an abutment surface 60 that is formed in a crowned manner. Alternatively, the outer abutment surface 60 is formed cylindrically. Further, the planet pin 6 has an inner surface 69 that delimits an axial bore 690 that has a shape that differs from the cylindrical shape. Thus, the bore 690 is formed in a double conical manner, wherein the inner diameter of the bore 690 has a minimum in the axial center 95 of the planet pin 6 and a maximum towards both axial ends.

Figure 7:
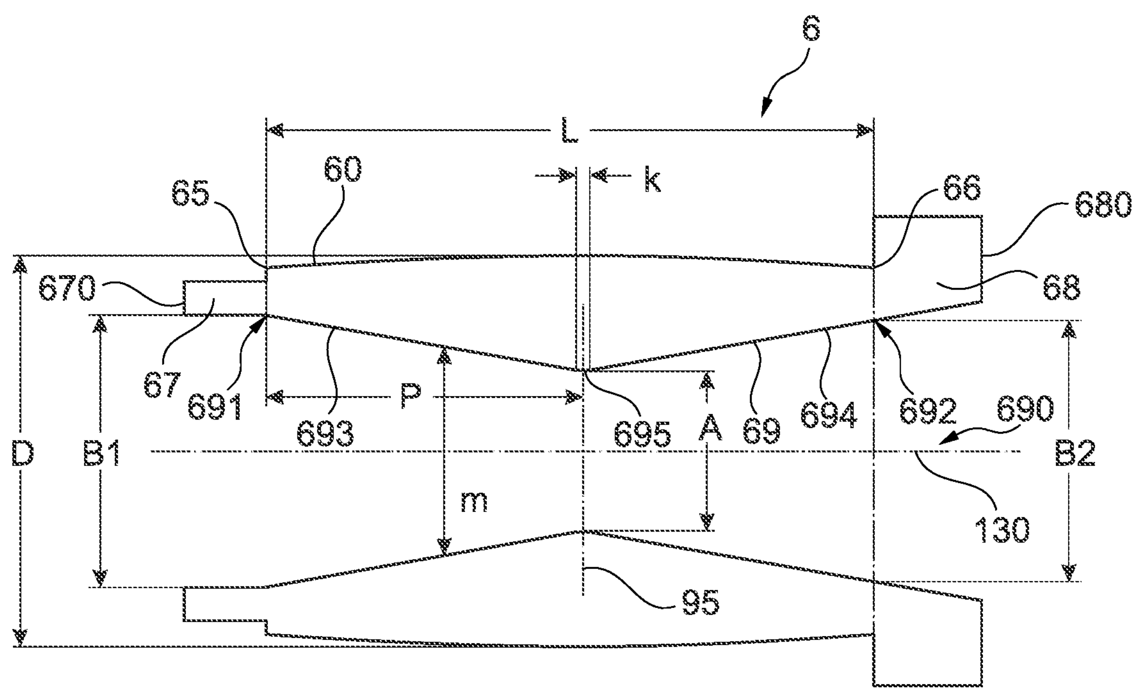
FIG. 7 shows the planet pin of FIG. 6 in an enlarged sectioned rendering.

FIG. 7 shows the planet pin 6 of FIG. 6 in an enlarged rendering, wherein the parameters relevant for the embodiment of the planet pin 6 are shown. Here, a longitudinal axis 130 of the planet pin 6 can be seen in the sectional rendering of FIG. 7. It is substantially identical to the rotation axis 110 of the planet gear 110. cf. FIG. 2, wherein, however, the hydrodynamic design of the slide bearing does entail a minor eccentricity, e.g. in the range of tenths of a millimeter.

The planet pin 6 forms an outer-side abutment surface 60 that has an axially forward end 65 and an axially rearward end 66. Between these two ends 65, 66, the abutment surface 60 forms a crowning in the sense that its outer diameter decreases towards the axial ends 65, 66 and reaches a minimum at the axial ends 65, 66. As has already been mentioned, the abutment surface 60 can alternatively also be formed in a cylindrical manner. The abutment surface 60 has a maximum outer diameter D.

On the inside, the planet pin 6 forms the inner surface 69 that delimits the axial bore or opening 690 radially outside and represents an inner shell surface of the planet pin 6. Here, the axial bore 690 has a first maximum inner diameter B1 at the axial end 691 of the inner surface 69 and a second maximum inner diameter B2 at the axial end 692 of the inner surface 69. The axial distance between these two axial ends is indicated by L (and is equal to the distance between the axial ends 65, 66 of the outer abutment surface 60). Between the two axial ends 691, 692 the axial bore 690 has a minimum inner diameter A. Here, it can be provided that B1 equals B2, or alternatively that B1 does not equal B2 *t*: B1=B2 or B1≠B2.

The difference between the minimum inner diameter A and the inner diameter m at a regarded axial position of the planet pin constantly increases towards the axial ends 691, 692.

In the exemplary embodiment of FIG. 7, the minimum inner diameter A is realized at the axial center 95 of the planet pin 6 and in a cylindrical area 695 of the axial length k about this axial center 95. The minimum of the inner diameter A is thus realized in a cylindrical area 695 with a constant inner diameter that extends symmetrically to the axial center 95 across a defined axial length k. However, this is not necessarily the case. Alternatively, the minimum of the inner diameter A is only reached along a circumferential line, or at one point in the longitudinal section shown in FIG. 7.

The axial distance between the axially forward end 691 of the inner surface 69 and the minimum of the inner diameter A, or, if the minimum is formed in a cylindrical area, the center of this cylindrical area, is indicated by P in FIG. 7. If, as shown in FIG. 7, the minimum of the inner diameter A is located in the axial center 95, P also indicates the distance between the axial ends 691, 692 of the inner surface 69 and the axial center 95 as well as the distance between the axial ends 65, 66 of the outer surface and the axial center 95.

In the longitudinal section, the inner surface 69 of the planet pin 6 forms a first curve 693 that extends between the cylindrical area 695 and the forward axial end 691, as well as a second curve 694 that extends between the cylindrical area 695 and the rearward axial end 692. In general, the curves 693, 694 can have any desired shape. The rectilinear embodiment shown herein is to be understood merely as an example. Alternatively, the curves can for example be circular or parabolic.

In the shown rectilinear embodiment of the curves 693, 694 what results is a double conical embodiment of the bore 690 in the sense that the bore 690 tapers off in a conical manner from the axial ends (at the axial positions 691, 692) towards the axial center 95 of the planet pin 6. In this way, an embodiment of the axial bore 690 is provided which is symmetrical to the axial center 95 and at the same time rotationally symmetrical, which results in the planet pin 6 having a greater wall thickness in its central area than at the axial ends of the inner surface 69.

The planet pin 6 has axial elongations or ends 67, 68 that respectively form a forward axial face side 670 of the planet pin 6 and a rearward axial face side 680 of the planet pin. As explained with respect to FIGS. 2 to 5, at these ends 67, 68 the planet pin 6 is respectively attached at a support plate.

It is to be understood that the outer surface 60 and the inner surface 69 have the same axial length L, wherein the points 65 and 691 as well as the points 66 and 692 have the same axial position. The outer surface 60 and the inner surface 69 extend in the axial area which serves for providing slide bearings with a planet gear. The elongations 67, 68 axially connecting thereto serve only for attaching the planet pin 6 inside the support plates, and do not play any role with respect to the shapes and dimensions regarded herein.

In embodiments of the invention, the planet pin 6 realizes certain ratios of the parameters A, B1, B2, k, P and L, as they have been defined above.

Thus, the following applies to the ratio of the length P to the axial total length L: $0 \leq P/L \leq 1$. This means that the minimum of the inner diameter A can in general be formed at any desired axial position of the planet pin 6. In particular, also asymmetrical arrangements are possible. The invention also comprises embodiment variants in which the minimum of the inner diameter A is formed at the one axial end 691 of the abutment surface (P=0) or at the other axial end 692 of the abutment surface (P=L). In other embodiment variants, the minimum of the inner diameter A is always located between the two axial ends 691, 692 of the abutment surface.

The following applies to the ratio of the axial length of the cylindrical area k to the axial total length L: $0 \leq k/L \leq 0.75$. The larger this ratio, the greater the axial extension of the cylindrical area 695. If the ratio k/L equals zero, f equals zero, i.e. then a cylindrical area with a constant outer diameter is no longer present.

The following applies to the ratio between the minimum inner diameter A and the maximum inner diameters B1, B2: $0 \leq A/B1 \leq 0.99$ and $0 \leq A/B2 \leq 0.99$. The closer this ratio is to 1, the smaller the taper of the axial bore 690.

The planet pin 6 shown in FIG. 7 is formed in a rotationally symmetrical manner.

Figure 8:
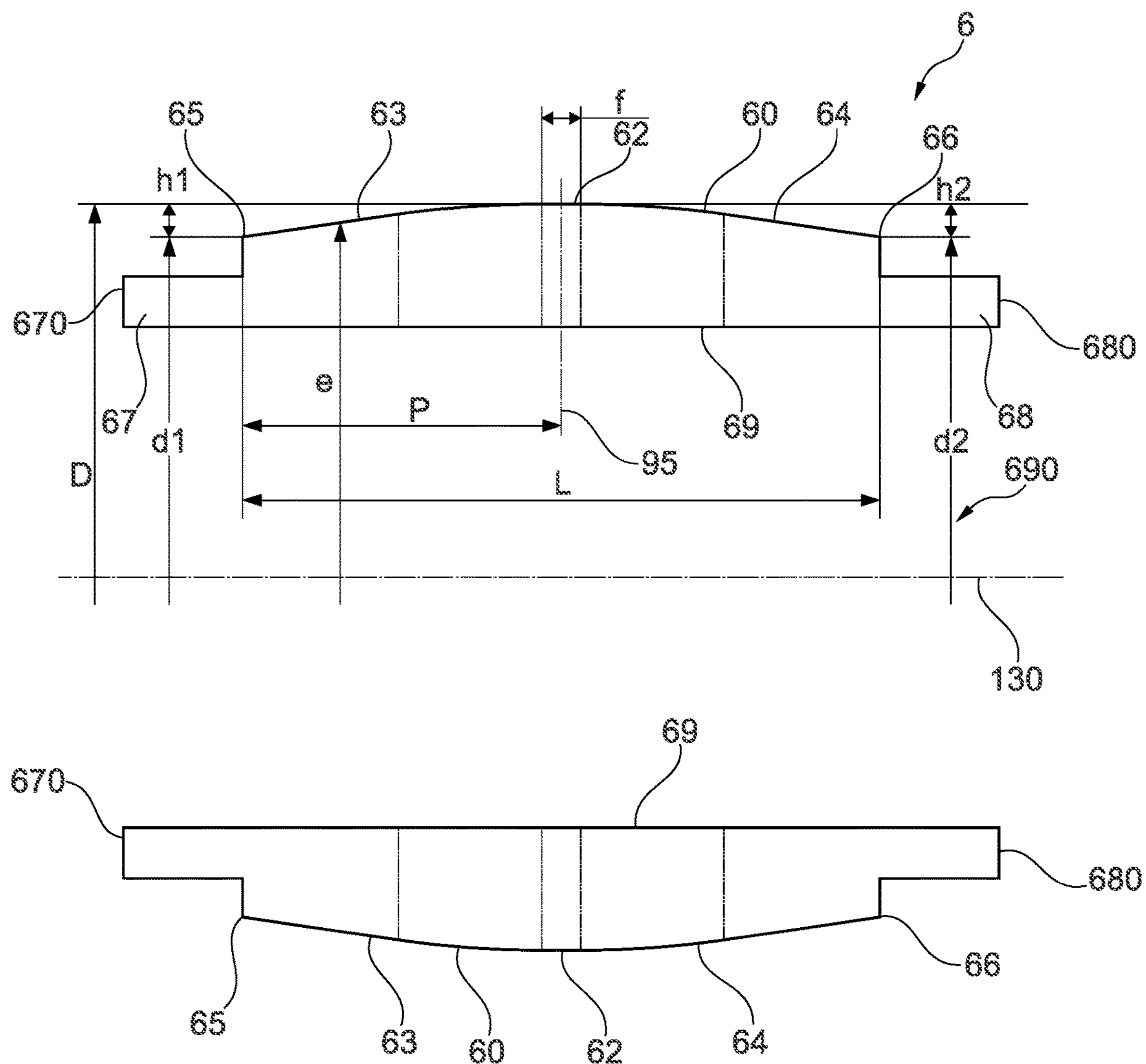
FIG. 8 shows a sectional view of another planet pin according to FIGS. 2 and 3.

In FIG. 8, the embodiment and the relevant parameters of a planet pin, which has a crowned design and is formed corresponding to a planet pin 6 according to FIGS. 2 to 5, are explained by way of example. Here, a longitudinal axis 130 of the planet pin 6 can be seen in the sectional rendering of FIG. 8. It is substantially identical with the rotation axis 110 of the planet gear 110, cf. FIG. 2. However, the hydrodynamic design of the slide bearing entails a minor eccentricity, e.g. in the range of tenths of a millimeter. Adjacent to an inner shell surface or inner surface 69 of the planet pin 6, the planet pin 6 forms an axial opening 690 that can serve for receiving a support pin of a torque carrier, for example the support pin 7 of FIG. 2.

Here, the axial opening 690 can be formed according to FIGS. 6 and 7, and accordingly have a diameter that varies in the axial direction.

The planet pin 6 forms an outer-side abutment surface 60 comprising an axially forward end 65 and an axially rearward end 66. The axial distance between these two ends is indicated by L. Between these two ends 65, 66, the abutment surface 60 forms a crowning in the sense that its outer diameter decreases towards the axial ends 65, 66 and reaches a minimum at the axial ends 65, 66.

Here, the planet pin 6 has a minimum outer diameter d1 at its axial end 65, a minimum outer diameter d2 at its axial end 66, and a maximum outer diameter D between its axial ends 65, 66. Here, half the difference h1 between the maximum outer diameter D and the minimum outer diameter d1 defines the crowning of the abutment surface between the axial position of the maximum outer diameter and the one end 65. Further, half the difference h2 between the maximum outer diameter D and the minimum outer diameter d2 defines the crowning of the abutment surface between the axial position of the maximum outer diameter and the other end 66.

It can be provided that d1 equals d2, or alternatively that d1 does not equal d2. Accordingly, h1 equals h2, or h1 does not equal h2.

The difference between the maximum outer diameter D and the outer diameter e at a regarded axial position of the planet pin constantly increases towards the axial ends 65, 66 of the planet pin 6.

In the exemplary embodiment of FIG. 8, the maximum outer diameter D is realized at the axial center 95 of the planet pin 6 and in a cylindrical area 62 of the axial length f about this axial center 95. The maximum of the outer diameter D is thus realized in a cylindrical area 62 with a constant outer diameter that extends symmetrically to the axial center 95 over a defined axial length f. However, this is not necessarily the case. Alternatively, the maximum of the outer diameter D is only reached at an apex along a circumferential line or in the longitudinal section shown in FIG. 13.

The axial distance between the axially forward end 65 of the abutment surface 60 and the maximum of the outer diameter D or, if the maximum is formed in a cylindrical area, to the center of this cylindrical area, is indicated by P in FIG. 8. In FIG. 8, P is located in the axial center 95 of the abutment surface due to the symmetrical embodiment of the abutment surface 60.

In the longitudinal section, the abutment surface 60 of the planet pin 6 forms a first convex curve 63 that extends between the cylindrical area 62 and the forward axial end 65, and forms a second convex curve 64 that extends between the cylindrical area 62 and the rearward axial end 66. In general, the curves 63, 64 can have any desired shape. For example, the curves can be formed in a circular, parabolic or rectilinear manner.

The planet pin 6 has axial elongations or ends 67, 68, which respectively form one forward axial face side 670 of the planet pin 6 and one rearward axial face side 680 of the planet pin. As has been explained with respect to FIGS. 2 to 5, the planet pin 6 is respectively affixed at these ends 67, 68 at a support plate.

In embodiments of the invention, the planet pin 6 realizes certain ratios of the parameters h, P, L and D, as they are defined above.

Thus, the following applies to the ratio of the length P to the axial total length L: $0 \le P/L \le 1$. This means that the maximum of the outer diameter D can in general be formed at any axial position of the planet pin 6. In particular, also asymmetrical arrangements are possible. The invention also comprises embodiment variants in which the maximum of the outer diameter D is formed at the one axial end of the abutment surface (P=0) or at the other axial end of the abutment surface (P=L). In other embodiment variants, the maximum of the outer diameter D is always located between the two axial ends 65, 66 of the abutment surface.

The following applies to the ratio of the axial length of the cylindrical area f to the axial total length L: $0 \le f/L \le 0.75$. The larger this ratio, the greater the axial extension of the cylindrical area. If the ratio f/L equals zero, f equals zero, i.e. a cylindrical area with a constant outer diameter is not provided.

The following applies to the ratio of half the difference h1, h2 between the maximum outer diameter D and the minimum outer diameter d1, d2 to the maximum outer diameter D: $0.00005 \le h1/D \le 0.005$ as well as $0.00005 \le h2/D \le 0.005$. These ratios determine the crowning of the abutment surface 60. Here, h1 may equal h2.

The planet pin 6 shown in FIG. 8 is formed in a rotationally symmetrical manner.

FIGS. 9-12 respectively show, in a sectional view, different embodiments of a planet pin 6 corresponding to the planet pin of FIG. 8, wherein it can be seen that, adjacent to the interior surface 69, the planet pin 6 forms an opening 690 that may for example serve for receiving a planet pin in a manner corresponding to the description of FIGS. 2 and 3.

Here, the parameters f, h, P and L that have been explained with reference to FIG. 8 are chosen differently in FIGS. 9-12, as will be described in the following.

Figure 9:
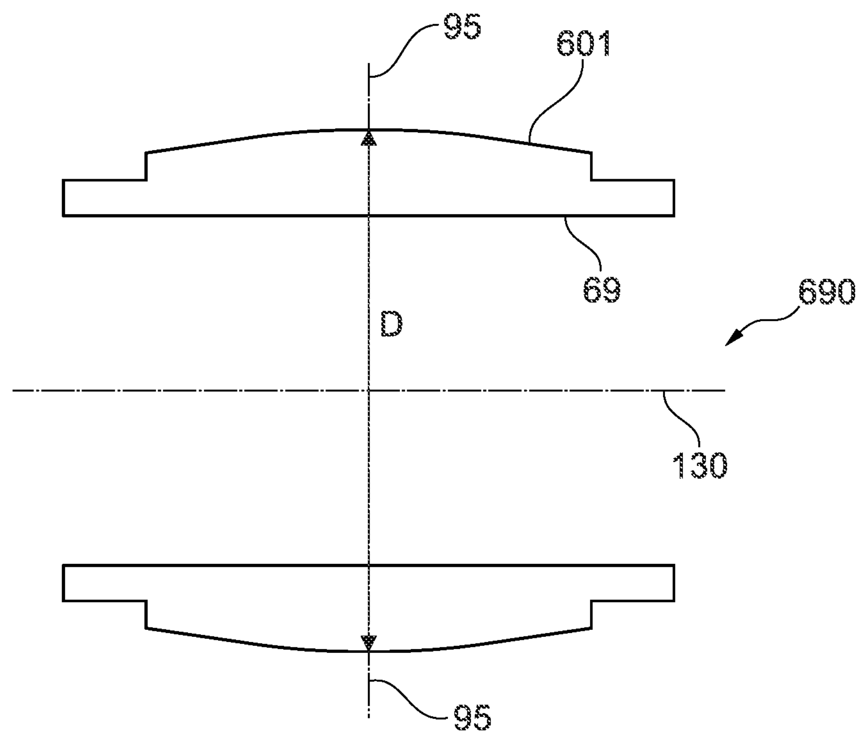
FIG. 9 shows a sectional view of a further exemplary embodiment of a planet pin provided with a crowning, wherein the planet pin forms an abutment surface that is formed in the manner of a circular arc.

In the exemplary embodiment of FIG. 9, the abutment surface 601 is formed without a cylindrical area, i.e. the parameter f equals zero. Correspondingly, the maximum outer diameter D is realized in the axial center 95 of the planet pin 6. The two convex curves 63, 64 of FIG. 16 form a common curve, which may for example be formed by a circular arc.

Here, the planet pin of FIG. 9 is formed to be mirror-symmetrical with respect to its axial center 95.

Figure 10:
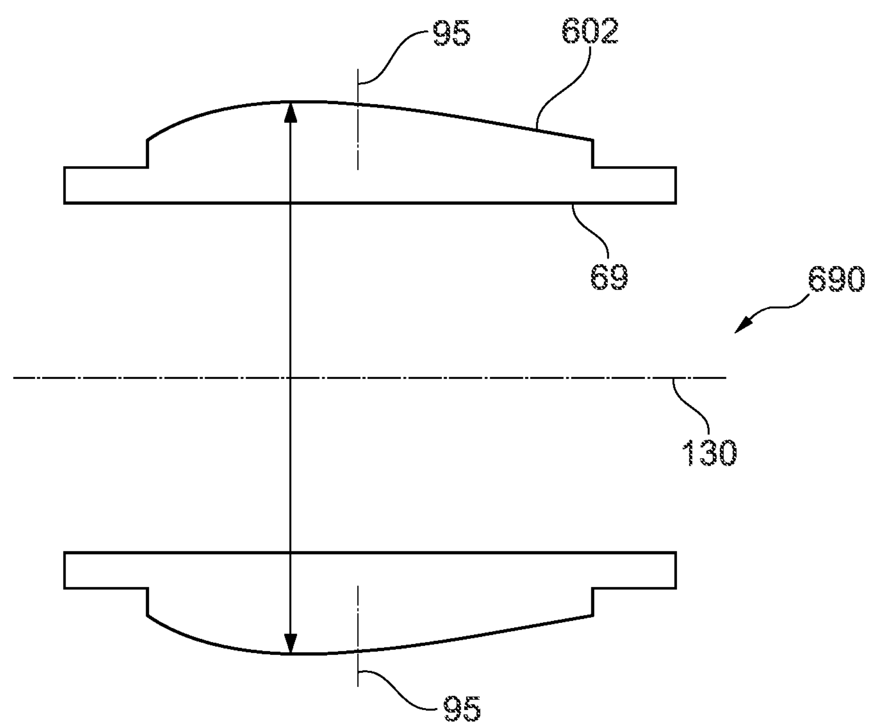
FIG. 10 shows a sectional view of a further exemplary embodiment of a planet pin provided with a crowning, wherein the planet pin forms an abutment surface that is formed in an asymmetrical manner.

In the exemplary embodiment of FIG. 10, the maximum of the outer diameter D is realized outside of the axial center 95, so that an asymmetry is realized in the design of the abutment surface 602. Again, no cylindrical area is provided. In the regarded sectional view, the two convex curves 63, 64 of FIG. 8 form a common curve 602. If may for example be formed by a parabolic arc.

Figure 11:
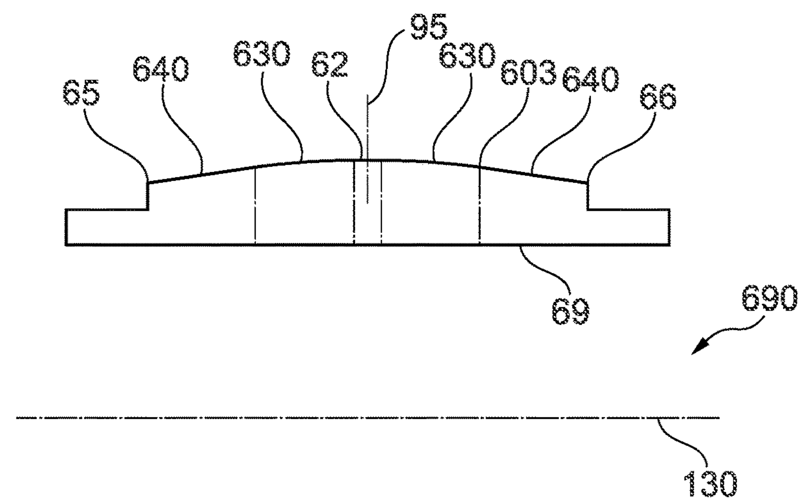
FIG. 11 shows a sectional view of a further exemplary embodiment of a planet pin provided with a crowning, wherein the planet pin is formed symmetrically and the abutment surface has differently formed areas.

In FIG. 11, an exemplary embodiment is regarded in which the abutment surface 603 forms a cylindrical area 62 in which the outer diameter D is maximal. This area 62 is formed in the center, so that the planet pin 6 is mirror-symmetrical with respect to its axial center 95.

Adjacent to the cylindrical area 62 on both sides, the abutment surface 603 forms areas that are curved in a circular manner, with conically shaped areas that extend up to the axial ends 65, 66 of the abutment surface 603 connecting to these areas. In the sectional view of FIG. 9, the abutment surface forms a circular arc 630 in the circularly curved area and a straight line 640 in the conically shaped area, with the latter extending up to the axial ends 65, 66 of the abutment surface 603.

Figure 12:
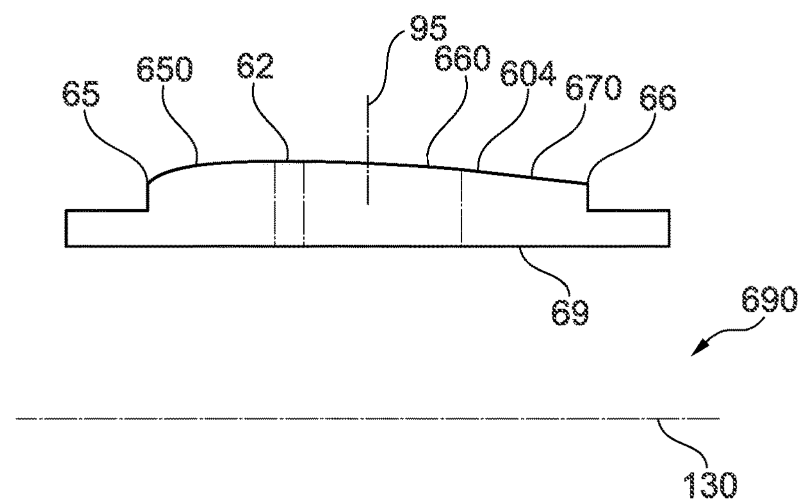
FIG. 12 shows a sectional view of a further exemplary embodiment of a planet pin provided with a crowning, wherein the planet pin is formed asymmetrically and the abutment surface has differently formed areas.
Figure 12:
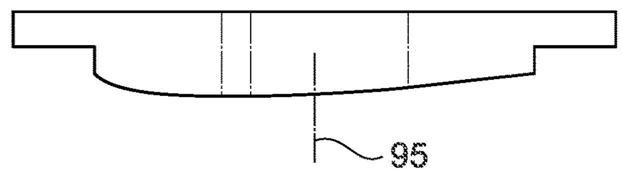

FIG. 12 shows an exemplary embodiment in which the maximum of the outer diameter D is realized outside of the axial center 95, so that an asymmetry is realized in the design of the abutment surface 604. Here, the abutment surface 604 forms a cylindrical area 62 in which the outer diameter D is maximal. However, this area 62 is formed in a manner offset to the axial center 95 of the planet pin 6. From the cylindrical area 62, a parabolically curved area extends up to the axially forward end 65 of the abutment surface 604, which forms a parabolic line 650 in FIG. 12. Two differently configured areas are formed between the cylindrical area 62 and the axially rearward end 66 of the abutment surface 604, at first a circularly curved area and, connecting thereto and extending up to the axial end 66, a conically tapering area, which form a circular arc 660 and a straight line 670 in the sectional view of FIG. 12.

Figure 13:
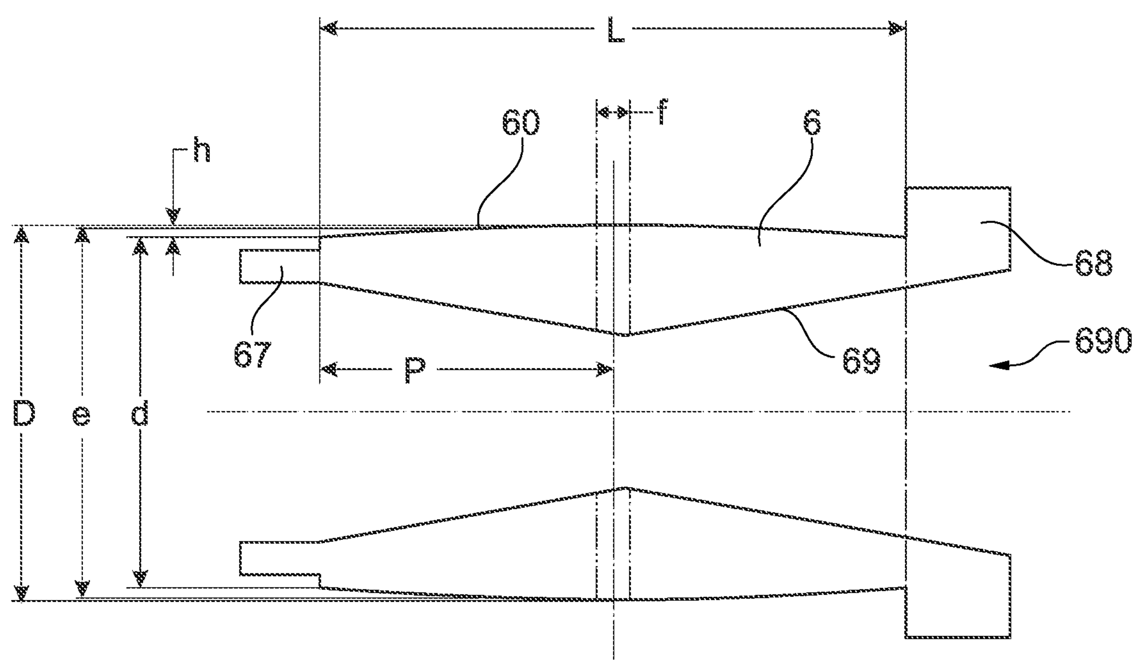
FIG. 13 shows another rendering of the planet pin of FIG. 6 in an enlarged sectioned rendering.

FIG. 13 is another enlarged rendering of the planet pin 6 of FIG. 6, wherein, in a manner corresponding to the rendering of FIG. 8, the parameters D, d, e, f, h, P and L relevant for the configuration of the planet pin 6 indicated therein are also shown. As for the definition of these parameters, the description of FIG. 8 is referred to. In contrast to FIG. 8, it is assumed that only the minimum outer diameter of the planet pin 6 is identical at the two axial ends, so that this parameter is indicated by d (without the differentiation between d1 and d2, and correspondingly also without the differentiation between h1 and h2 as it is being made in FIG. 8).

Figure 14:
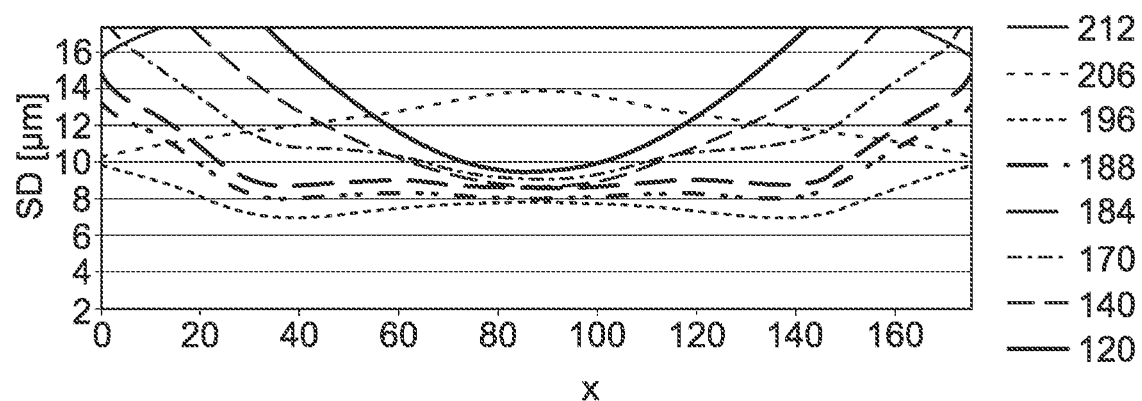
FIG. 14 shows the lubricating film thickness of a slide bearing depending on the axial position of the slide bearing for a planet pin with an abutment surface embodied in a crowned design.
Figure 15:
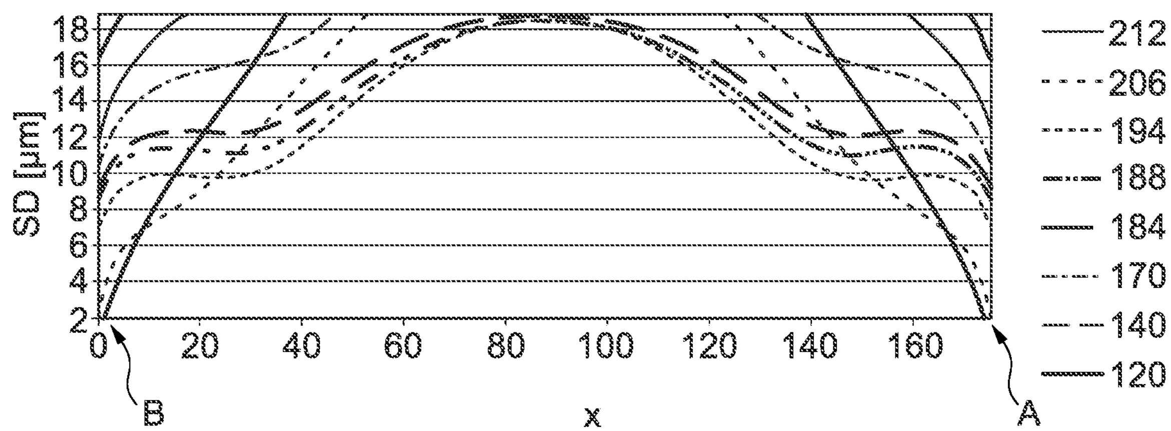
FIG. 15 shows the lubricating film thickness of a slide bearing depending on the axial position of the slide bearing for a cylindrically formed planet pin.

The advantages associated with the crowning of the planet pin are illustrated in FIGS. 14 and 15, which respectively show the lubricating film thickness SD of the slide bearing depending on the axial position x of the slide bearing. Here, FIG. 15 shows the conditions at a planet pin, which has a purely cylindrically shaped surface that is not provided with a crowning, at 80% loading. It can be seen that the lubricating film thickness strongly decreases towards the axial ends (cf. arrows A, B), which leads to an increased lubrication film thickness and the danger of a metal-on-metal contact between the planet pin and the planet gear.

FIG. 14 shows the lubricating film thickness of the slide bearing depending on the axial position of the slide bearing for a planet pin, which has a surface provided with a crowning, at 100% loading. A sufficient lubricating film thickness is ensured also at the axial ends.

The present invention is not limited in its design to the above-described exemplary embodiments. In particular, the described specific shapes of the planet gear 4 and of the planet pin 6 are to be understood merely as examples.

Further, it is to be understood that the features of the individual described exemplary embodiments of the invention can be combined with each other in different combinations. As far as ranges are defined, they comprise all values within this range, as well as all partial ranges that fall within a range.

The invention claimed is:

1. A planetary gearing, comprising:

a sun gear rotating about a rotation axis of the planetary gearing and driven by a sun shaft, wherein the rotation axis defines an axial direction of the planetary gearing, a plurality of planet gears that are driven by the sun gear, wherein each planet gear has an axially forward face side and an axially rearward face side, a ring gear engaging the plurality of planet gears, and a plurality of planet pins, each respectively comprising an outer-side abutment surface, which comprises an axial forward end and an axial rearward end, wherein respectively one of the plurality of planet pins is arranged inside one of the plurality of planet gears and the one of the plurality of planet pins and the one of the plurality of planet gears form a lubricated journal bearing, each of the plurality of planet pins comprising:

an axial bore and an inner surface comprising an axially forward end and an axially rearward end, wherein an inner diameter of the axial bore varies between the axially forward end and the axially rearward end of the inner surface, and has a maximum at least at one axial end, and a crowning at the outer-side abutment surface such that an outer diameter decreases from a maximum outer diameter towards at least one chosen from the axially forward end and the axially rearward end of the outer-side abutment surface, and has a minimum outer diameter at the at least one chosen from the axially forward end and the axially rearward end, wherein the each of the plurality of planet pins planet pin has an axially forward end and an axially rearward end, which are positioned at an axial distance to the axially forward end and the axially rearward end of the inner surface, wherein, at the axially forward end, the each of the plurality of planet pins is affixed at a forward support plate and, at the axially rearward end, is affixed at a rearward support plate, or is formed in one piece with the rearward support plate.

2. The planetary gearing according to claim 1, wherein each of the plurality of planet pins has maximum inner diameters at the axially forward and rearward ends respectively, of the inner surface and a minimum inner diameter between the axially forward and rearward ends, wherein the maximum inner diameters are identical on both the axially forward and rearward ends.

3. The planetary gearing according to claim 1, wherein each of the plurality of planet pins has maximum inner diameters at the axially forward and rearward ends respectively, of the inner surface and a minimum inner diameter between the axially forward and rearward ends, wherein the maximum inner diameters are different at both the axially forward and rearward ends.

4. The planetary gearing according to claim 1, wherein the inner diameter of the axial bore continuously increases towards at least one chosen from the axially forward and rearward ends of the inner surface.

5. The planetary gearing according to claim 1, wherein the inner surface forms a first curve in a longitudinal section, extending between a minimum inner diameter and the axially forward end, and forms a second curve extending between the minimum inner diameter and the axially rearward end.

6. The planetary gearing according to claim 5, wherein at least one chosen from the first curve and the second curve is formed in a rectilinear manner.

7. The planetary gearing according to claim 1, wherein the axial bore is formed as a double conical bore which respectively conically tapers from the forward and rearward axially ends towards an axial center of the axial bore.

8. The planetary gearing according to claim 1, wherein a minimum of the inner diameter is formed by a circumferential line.

9. The planetary gearing according to claim 1, wherein a minimum of the inner diameter is formed by a cylindrical area with a constant inner diameter that extends over a defined axial length.

10. The planetary gearing according to claim 9, wherein a ratio of the axial length of the cylindrical area to an axial total length of the inner surface is between 0 and 0.75.

11. The planetary gearing according to claim 1, wherein a minimum of the inner diameter is at an axial center of the each of the plurality of planet pins.

12. The planetary gearing according to claim 1, wherein a minimum of the inner diameter is outside an axial center of the each of the plurality of planet pins.

13. The planetary gearing according to claim 1, wherein a ratio between a minimum inner diameter and the maximum inner diameter is respectively between 0 and 0.99.

14. The planetary gearing according to claim 1, wherein the each of the plurality of planet pins is formed as a rotational body.

15. The planetary gearing according to claim 1, wherein the plurality of planet pins are coupled to a torque carrier and the torque carrier rotates about the rotation axis of the planetary gearing as the sun gear rotates and the ring gear is fixedly attached.

16. The planetary gearing according to claim 15, wherein the plurality of planet pins are positioned in axial bores of the torque carrier or are fixedly connected with a forward support plate and with a rearward support plate, wherein the forward support plate is coupled with the torque carrier for torque transmission.

17. The planetary gearing according to claim 1, wherein the each of the plurality of planet pins has minimal outer diameters at the forward and rearward axial ends of the outer-side abutment surface and the maximum outer diameter is between the forward and rearward axial ends.

18. A gear fan engine, comprising:

a fan stage, a fan shaft via which the fan stage is driven, a turbine shaft, wherein the turbine shaft and the fan shaft are coupled via the planetary gearing according to claim 1, wherein the turbine shaft forms the sun shaft, the plurality of planet pins are coupled with a torque carrier and the torque carrier is coupled with the fan shaft.

* * * * *